Figure 1:
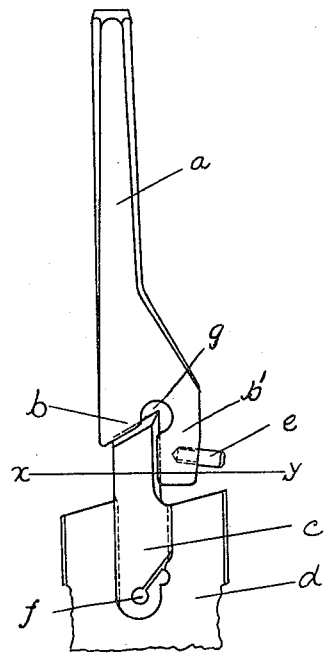

H. B. McDONALD.
SAW TOOTH TOOL FOR INSERTING AND REMOVING SEPARABLE TEETH OF SAWS.
APPLICATION FILED JUNE 25, 1915.

1,195,143.  Patented Aug. 15, 1916.

Section at x.y.

Witnesses.
Robert H. Holton
Alfred M. Remington

Inventor.
Hiram B. McDonald

UNITED STATES PATENT OFFICE.

HIRAM B. McDONALD, OF FITCHBURG, MASSACHUSETTS, ASSIGNOR TO SIMONDS MANUFACTURING COMPANY, OF FITCHBURG, MASSACHUSETTS, A CORPORATION OF MASSACHUSETTS.

SAW-TOOTH TOOL FOR INSERTING AND REMOVING SEPARABLE TEETH OF SAWS.

1,195,143.     Specification of Letters Patent.     Patented Aug. 15, 1916.

Application filed June 25, 1915. Serial No. 36,287.

*To all whom it may concern:*

Be it known that I, HIRAM B. McDONALD, a citizen of the United States of America, residing at Fitchburg, in the county of Worcester and State of Massachusetts, have invented an Improvement in Saw-Tooth Tools for Inserting and Removing Separable Teeth of Saws, of which the following is a specification.

The invention relates to tools for inserting and removing separable teeth of saws, particularly of the kind commonly known as straight cut-off teeth, and it consists of a metal bar provided at one end with a surface to receive percussive blows and at the other end with grooved jaws, the marginal limits of the grooves being adapted to straddle the sharp edges of the cutting portion of the tooth and bear upon the adjacent beveled faces of the end and front-side parts of the cutting end of the teeth, and at the angle of intersection of the inner bearing faces of the grooved jaws an enlarged opening is made to receive and accommodate the points of the teeth without contact therewith, by which each tooth may be readily inserted in the socket in the saw-plate by blows upon the end of the tool opposite to the jaws; and further, said tool is provided with an off-set at the jaw end thereof, so that one of the jaws projects beyond or out of line with the bar which is to receive the blows, and thus adapts such projection to carry a portion which may engage an opening in the tooth, for the purpose of forcing it outward by a blow upon the said surface provided at the end of the bar for that purpose. The off-set enables the tool at its jaw end to engage the tooth, and at the same time locates the opposite end sufficiently far away from the surface of the saw plate to conveniently receive the percussive blows for removing the tooth therefrom without striking the plate.

Heretofore tools for inserting and removing separable saw teeth have been of the kind which have a lever action, and they have been used upon teeth having a curved exterior periphery. Tools of this character are undesirable for inserting straight teeth, especially where a percussive blow in direct line with the tooth sets it into place or removes it, with great ease, even when the tooth is held fast in the plate by rust, and with tools having the lever action there is liability of its slipping from the tooth which is being operated upon and thus causing the hand of the operator to be cut or torn by sudden contact with teeth already in place; also there is great difficulty in removing a corroded tooth with a tool of lever action, while a percussive action quickly frees it from its socket.

Figure 3:
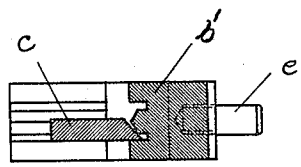
Figure 2:
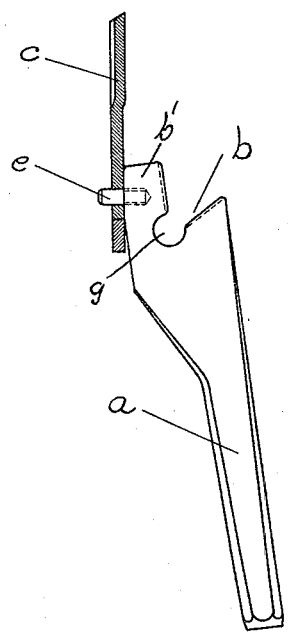

In the drawings forming a part of this specification,—Figure 1 is a side elevation of the improved tool in position upon the straight separable tooth when it has been set in place in the saw plate by a blow upon the upper end of the tool; Fig. 2 is a side elevation of the tool in the reversed position with the projection thereof engaging an opening in the tooth, ready to force it out of its socket by a blow upon the small end of the tool; and Fig. 3 is a cross-section of the tool, and a tooth, on line $x$—$y$ of Fig. 1.

Referring to the drawings by designating letters, $a$ is the shank of the metal tool, the small end of which is intended for the percussive blows; $b$ is one grooved jaw, the margins of the grooves in which are adapted to straddle the cutting edge of the end of the tooth $c$ and rest upon its beveled faces, and $b'$ is the other similarly grooved jaw which bears against the beveled faces of the front-side or cutting edge of the tooth, as illustrated in sectional view in Fig. 3, wherein these jaws are in place as shown; a blow upon the small end of the tool will readily force the tooth into place in its socket. At the angle of intersection of the bearing faces of the jaws they are cut away to form an opening $g$ for the point of the tooth. The jaws are formed with double grooves to accommodate alternate teeth which are set in opposite directions.

$d$ is the saw plate in which the sockets for the teeth are formed, and as here shown a hole $f$ is drilled near the lower end of the tooth and a slit extends from this hole out to the edge of the tooth, thereby forming a spring tongue to lock the tooth in its socket.

$e$ is a projection from the outside of the jaw $b'$, conveniently it may be a pin fixed therein. When a tooth is to be removed, the tool is reversed in position, the projection e is inserted in the opening f, and by a blow upon the small end of the tool, the tooth is forced out of its socket.

I claim:

A drift or tool for inserting detachable teeth of saws, consisting of a metal bar, provided at one end with a surface to receive percussive blows and at the other end with grooved jaws adapted to bear upon the beveled faces of the end and front-side portions of the cutting end of the tooth, and an enlarged opening at the angle of intersection of the bearing faces of the grooved jaws, to receive the point of the tooth.

HIRAM B. McDONALD.

Witnesses:
ALFRED M. REMINGTON,
ROBERT H. HOLTON.

Copies of this patent may be obtained for five cents each, by addressing the "Commissioner of Patents, Washington, D. C."